(12) United States Patent
West et al.

(10) Patent No.: US 12,072,053 B2
(45) Date of Patent: Aug. 27, 2024

(54) WATERTIGHT ELECTRICAL CONDUIT

(71) Applicant: FRANKLIN FUELING SYSTEMS, LLC, Madison, WI (US)

(72) Inventors: John Robert William West, Ipswich (GB); Andrea Ticci, Ipswich (GB); Paul Ridge, Suffolk (GB)

(73) Assignee: Franklin Electric Co., Inc., Fort Wayne, IN (US)

( * ) Notice: Subject to any disclaimer, the term of this patent is extended or adjusted under 35 U.S.C. 154(b) by 327 days.

(21) Appl. No.: 16/047,924

(22) Filed: Jul. 27, 2018

(65) Prior Publication Data

US 2019/0211948 A1    Jul. 11, 2019

Related U.S. Application Data

(60) Provisional application No. 62/616,400, filed on Jan. 11, 2018.

(51) Int. Cl.
*F16L 5/02* (2006.01)
*B29C 65/00* (2006.01)
(Continued)

(52) U.S. Cl.
CPC ............ *F16L 5/022* (2013.01); *B29C 65/348* (2013.01); *B29C 66/131* (2013.01); *F16L 9/147* (2013.01); *F16L 13/0272* (2013.01); *F16L 47/02* (2013.01); *F16L 47/03* (2013.01); *F16L 47/24* (2013.01); *F16L 47/30* (2013.01); *F16L 58/1054* (2013.01); *F16L 58/109* (2013.01); *H02G 3/02* (2013.01); *H02G 3/0481* (2013.01); *H02G 9/06* (2013.01); *H02G 9/10* (2013.01)

(58) Field of Classification Search
CPC ....... F16L 5/022; F16L 9/147; F16L 13/0272; F16L 47/24; F16L 47/30; F16L 57/1081; F16L 58/109
USPC .................................. 285/21.2, 293.1, 294.1
See application file for complete search history.

(56) References Cited

U.S. PATENT DOCUMENTS 3,348,995 A * 10/1967 Baker ..................... B32B 15/08
  428/215
3,470,046 A *  9/1969 August ............... F16L 58/1081
  138/143
(Continued)

FOREIGN PATENT DOCUMENTS

AU           684166 B2 * 12/1997

OTHER PUBLICATIONS

Appendix A—Piping & Containment Systems, Service Station Hardware, Submersible Pumping Systems, Brasil Product Catalogue, Aug. 1, 2012. 96 pages.
(Continued)

*Primary Examiner* — Atif H Chaudry
(74) *Attorney, Agent, or Firm* — Faegre Drinker Biddle & Reath LLP

(57) ABSTRACT

A rigid conduit (for example, a metal conduit) featuring an electrofusable section secured to the rigid conduit to allow the rigid conduit to be electrofusion welded to another component of the fueling installation, such as a sump or further electrofusable conduit, is provided by the present disclosure. In certain exemplifications, multiple spaced electrofusable sections are provided on the rigid conduit, with corrosion resistant sections spanning the electrofusable sections in certain arrangements.

4 Claims, 5 Drawing Sheets

(51) Int. Cl.
  *B29C 65/34*   (2006.01)
  *F16L 9/147*   (2006.01)
  *F16L 13/02*   (2006.01)
  *F16L 47/02*   (2006.01)
  *F16L 47/03*   (2006.01)
  *F16L 47/24*   (2006.01)
  *F16L 47/30*   (2006.01)
  *F16L 58/10*   (2006.01)
  *H02G 3/02*    (2006.01)
  *H02G 3/04*    (2006.01)
  *H02G 9/06*    (2006.01)
  *H02G 9/10*    (2006.01)

(56) References Cited

U.S. PATENT DOCUMENTS

| | | | | |
|---|---|---|---|---|
| 4,932,257 | A * | 6/1990 | Webb | B29C 66/1224 285/21.2 |
| 5,277,456 | A * | 1/1994 | Mer | B29C 65/342 285/148.13 |
| 6,012,743 | A * | 1/2000 | Godeau | F16L 31/00 285/286.2 |
| 6,127,662 | A * | 10/2000 | Katz | B29C 65/342 156/274.2 |
| 2003/0098584 | A1* | 5/2003 | Minemyer | F16L 37/138 285/322 |
| 2005/0029802 | A1* | 2/2005 | Boudry | B29C 65/3432 285/21.2 |
| 2006/0249213 | A1* | 11/2006 | Stieler | F16L 9/147 138/109 |
| 2009/0246053 | A1* | 10/2009 | Wright | F16L 5/02 417/572 |
| 2010/0057175 | A1* | 3/2010 | McDonald | A61B 5/287 607/116 |
| 2013/0025730 | A1* | 1/2013 | Roder | F16L 13/146 138/109 |
| 2013/0299034 | A1* | 11/2013 | Sundholm | B29C 65/342 138/140 |
| 2015/0027581 | A1* | 1/2015 | Bouey | B29C 65/561 138/141 |
| 2015/0042085 | A1* | 2/2015 | Sundholm | B29C 66/1142 285/21.2 |

OTHER PUBLICATIONS

Appendix B—Total System Solutions—Site Starter, Cable Tight System, Polyethylene Sumps, 2017. 1 page.
Appendix C—Cable Tight Systems—Franklin Fueling Systems—Americas, Cable Tight System, Watertight Wire Management, 2018. http://www.franklinfueling.com/americas/wm/featured/27237/en/cable-tight-system#Highlights 5 pages.
Appendix D—Cable Tight System, 2017. 3 Pages.
Appendix E—Cable Tight System, Installation Guide, 2017. 64 pages.
Appendix F—Wire Management, Cable Tight Wire Management System, 2017. 4 pages.

* cited by examiner

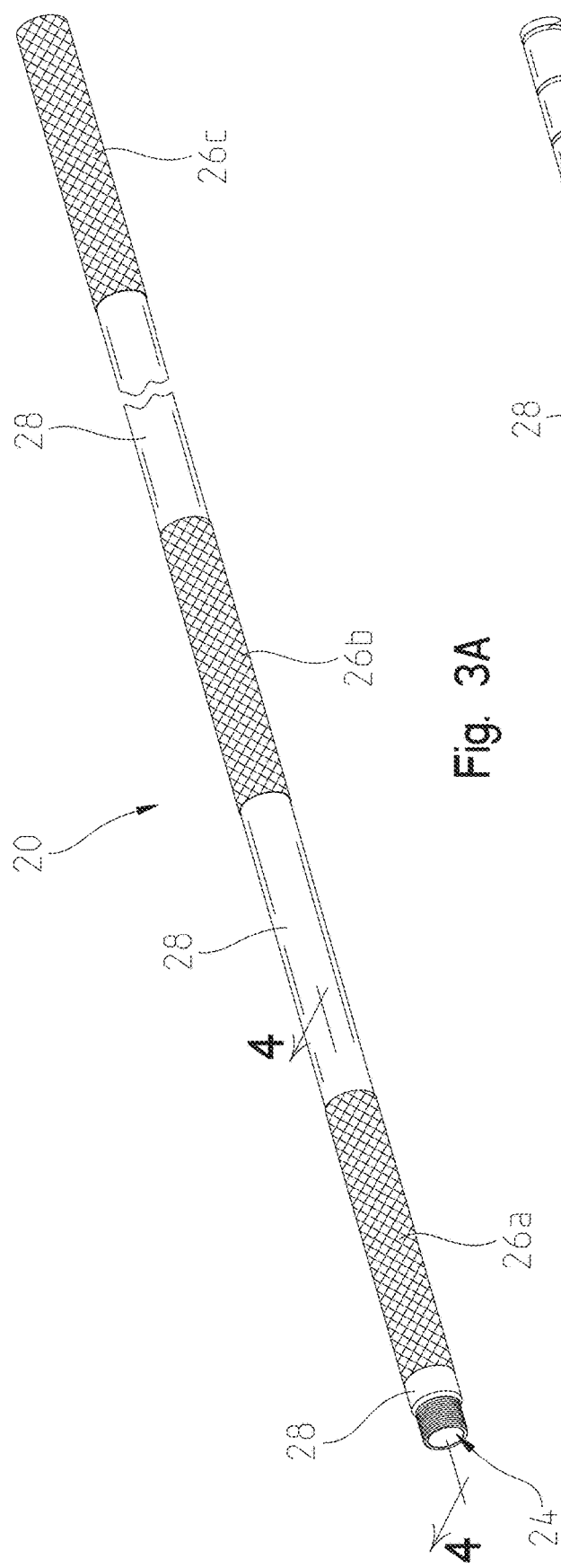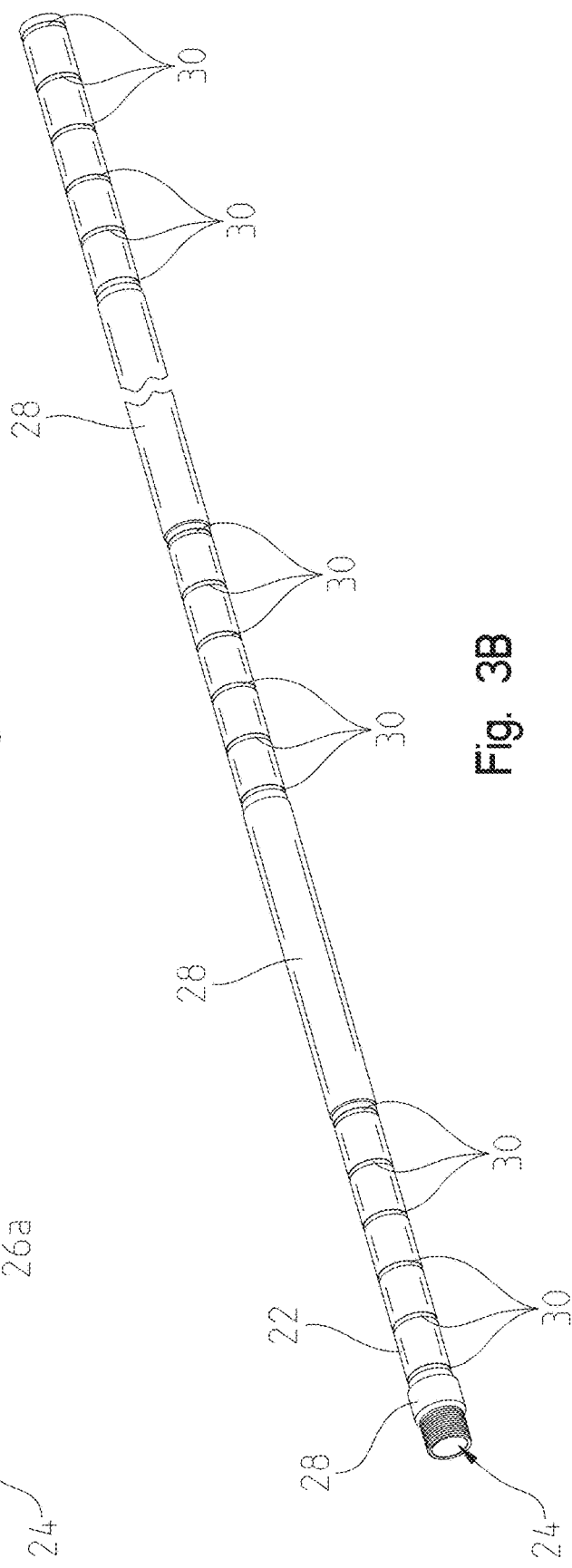
Fig. 3A
Fig. 3B

WATERTIGHT ELECTRICAL CONDUIT

RELATED APPLICATIONS

The present application claims the benefit of priority to U.S. Provisional Application No. 62/616,400, filed on Jan. 11, 2018, the entire disclosure of which is hereby expressly incorporated herein by reference.

FIELD OF THE DISCLOSURE

The present disclosure relates generally to an electrical conduit and, more particularly, to metal conduit sized for use as a conduit for electrical lines and featuring electrofusable material positioned overtop the outer diameter of the metal conduit.

BACKGROUND OF THE DISCLOSURE

Transition chambers or sumps may be included in fueling systems to transition pipe lines, wires, electrical lines, or other conduits between various components of the fueling system. For example, electrical transition chambers/sumps (throughout this document, electrical transition chamber and sump are used interchangeably) are included in a fueling system for providing containment to hydrocarbon piping (i.e., piping used to convey hydrocarbon product such as gasoline) and to provide space in which electrical connections can be made. Electric lines electrically connecting sensors and other electrical components on and in fuel tanks and electrical components associated with the fuel dispensers to each other and to a power supply and a fuel management system in a fueling service station are positioned through sump walls to provide access to the elements of the fueling station component to which the sump is associated.

Fueling sumps receive various electrical lines in a fueling system through conduit traversing the wall of the sump. For a variety of reasons, the portion of the conduit passing through a sump wall comprises a rigid conduit formed of metal. For example, U.S. regulations require that the first 3 feet (91.44 centimeters) of conduit leaving a sump be steel. Typical sumps are made of either polyethylene or fiberglass, necessitating a compression fitting between the metal conduit and the sump to maintain the water-tight integrity of the sump. The metal conduit that traverses the sump wall is subsequently connected to a polyvinyl chloride (PVC) conduit, again requiring joining of two dissimilar materials, for example, with a compression fitting.

SUMMARY OF THE DISCLOSURE

The present disclosure provides a rigid conduit (e.g., a metal conduit) featuring an electrofusable section secured to the rigid conduit to allow the rigid conduit to be electrofusion welded to another component of a fueling installation, such as a sump or further electrofusable conduit. In certain exemplifications, multiple spaced electrofusable sections are provided on the rigid conduit, with corrosion resistant sections spanning the electrofusable sections.

The above-mentioned and other features of the invention and the manner of obtaining them will become more apparent and the invention itself will be better understood by reference to the following description of exemplary embodiments of the invention taken in conjunction with the accompanying drawings.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 3A is a perspective view of a rigid conduit made in accordance with the present disclosure, the rigid conduit including an underlying metal conduit with overlaid electrofusable plastic sections;

FIG. 3B is a perspective view of the underlying metal conduit of FIG. 3A, with the overlaid electrofusable plastic sections removed;

Figure 1:
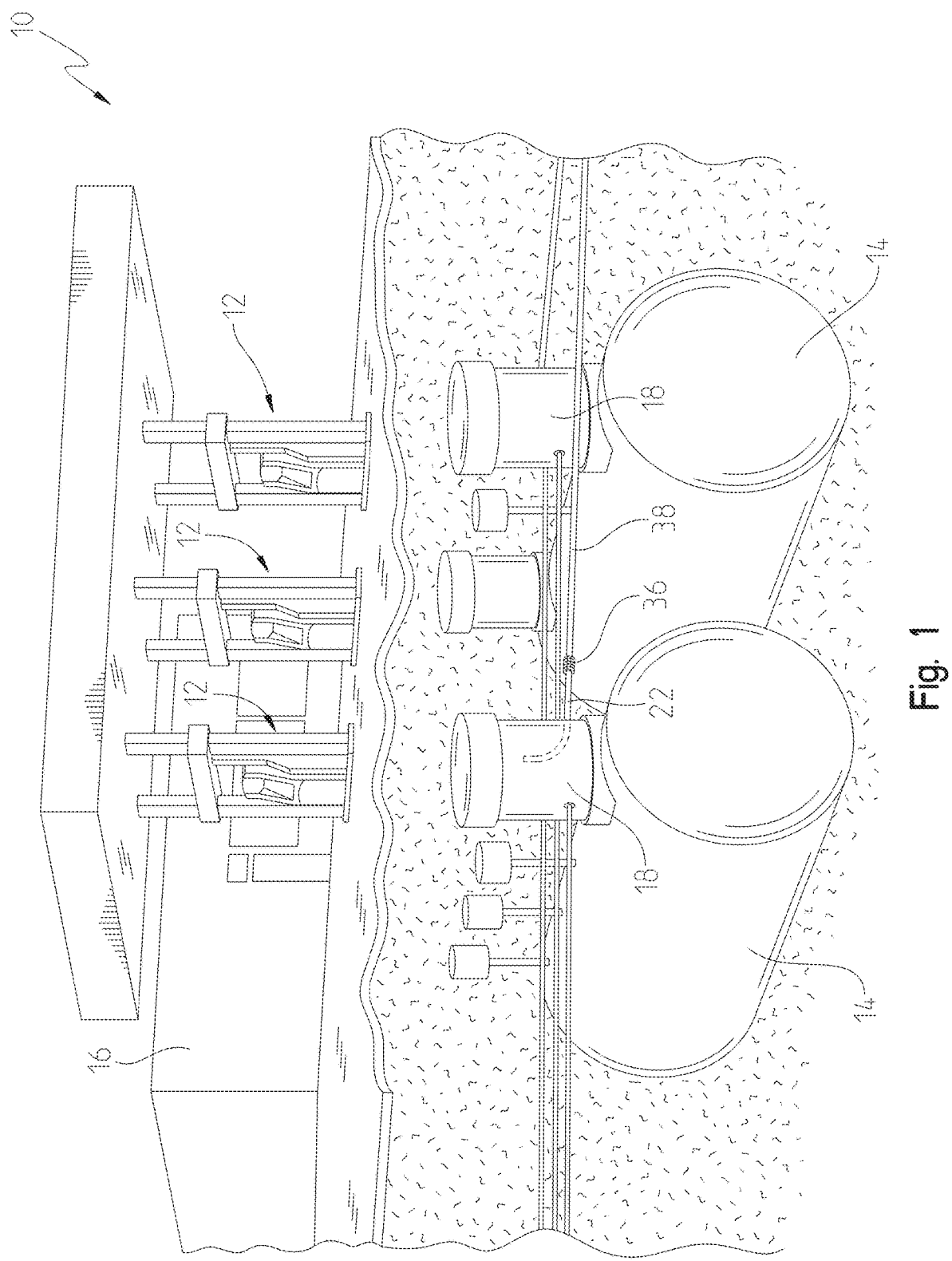
FIG. 1 is a perspective, schematic, partial cutaway view of a fueling station implementing the electrical conduit of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Low-density polyethylene (LDPE) can be extruded over a metal conduit to provide corrosion resistance to the metal conduit and form a rigid conduit assembly; however, this material does not allow for successful electrofusion to the rigid conduit assembly, owing to the allowable thickness of such a coating, the manufacturing tolerance allowed by extrusion and the characteristics of the coating material. Particularly, attempts to electrofusion weld to an extruded corrosion resistant layer yields failure in industry standard strength tests. In the present disclosure, high-density polyethylene (HDPE) is secured over the metal conduit in a thickness suitable for electrofusion welding such that the HDPE is electrofusable. HDPE may also be used as the material of the corrosion resistant coating, if desired. Alternative materials for the electrofusion sections include medium-density polyethylene (HDPE), LDPE, or linear low-density polyethylene (LLDPE), when applied in the appropriate thickness and at acceptable manufacturing tolerance to be electrofusable. In exemplifications of the present disclosure, virgin (pure) material with no re-grind is utilized to form the electrofusable sections. Polyamides can also be used as the electrofusable material.

Throughout this document, "electrofusable" is used to denote a material capable of being electrofusion welded to another component (e.g. an electrofusion fitting) to create a fluid tight seal capable of withstanding industry standard leak and/or strength testing. Such testing can be done in accordance with UL 971 Nonmetallic Underground Piping For Flammable Liquids, UL 2447 Outline of Investigation for Containment Sumps, Fittings and Accessories for Fuels, or EN 14125:2013 Thermoplastic and flexible metal pipework for underground installation at petrol filling stations (see, e.g., subsections, 5.4.5 Pull Test, 7.2.11 Pull-out test, and 7.2.12 Fitting Pull-out test). The entire disclosures of UL 971, UL 2447 and EN 14125:2013 are hereby explicitly incorporated by reference herein. All references to UL or any other specifications in this document will be understood by a person having ordinary skill in the art as a version of the cited specification adopted and in use as of the filing of this patent application.

Referring to FIG. 1, fueling station 10 includes a plurality of fuel dispensers 12 in fluid communication with underground storage tanks (UST) 14. As is typical in such installations, fuel dispensers 12 are in fluid communication (not shown) with underground storage tanks 14 so that fuel nozzles associated with each fuel dispenser 12 can be utilized to dispense hydrocarbon product stored in one of underground storage tanks 14 to, e.g., a vehicle or storage container. To effect the transfer of hydrocarbon product from underground storage tanks 14 through fuel dispensers 12, fuel dispensers 12 are electrically connected to, e.g., submersible pumps immersed in hydrocarbon product contained in one of underground storage tanks 14. Fuel dispensers 12 are also electrically connected with at least one fuel management system contained in control building 16 which also houses fueling station attendants. Generally speaking, electrical wires are run between the various components of fueling station 10 via buried conduits.

Positioned atop underground storage tanks 14 are sumps 18. Sumps 18 can contain a variety of components; including electrically controlled components and the riser pipe/drop tube combination providing for fluid communication with the associated underground storage tank 14, for example. Electrical lines positioned through conduits in fueling station 10 include high voltage cables such as power cables and low voltage cables such as communication cables connected to, for example, sensors, probes or displays. Sumps (not shown) are also positioned under each fuel dispenser 12.

Figure 2:
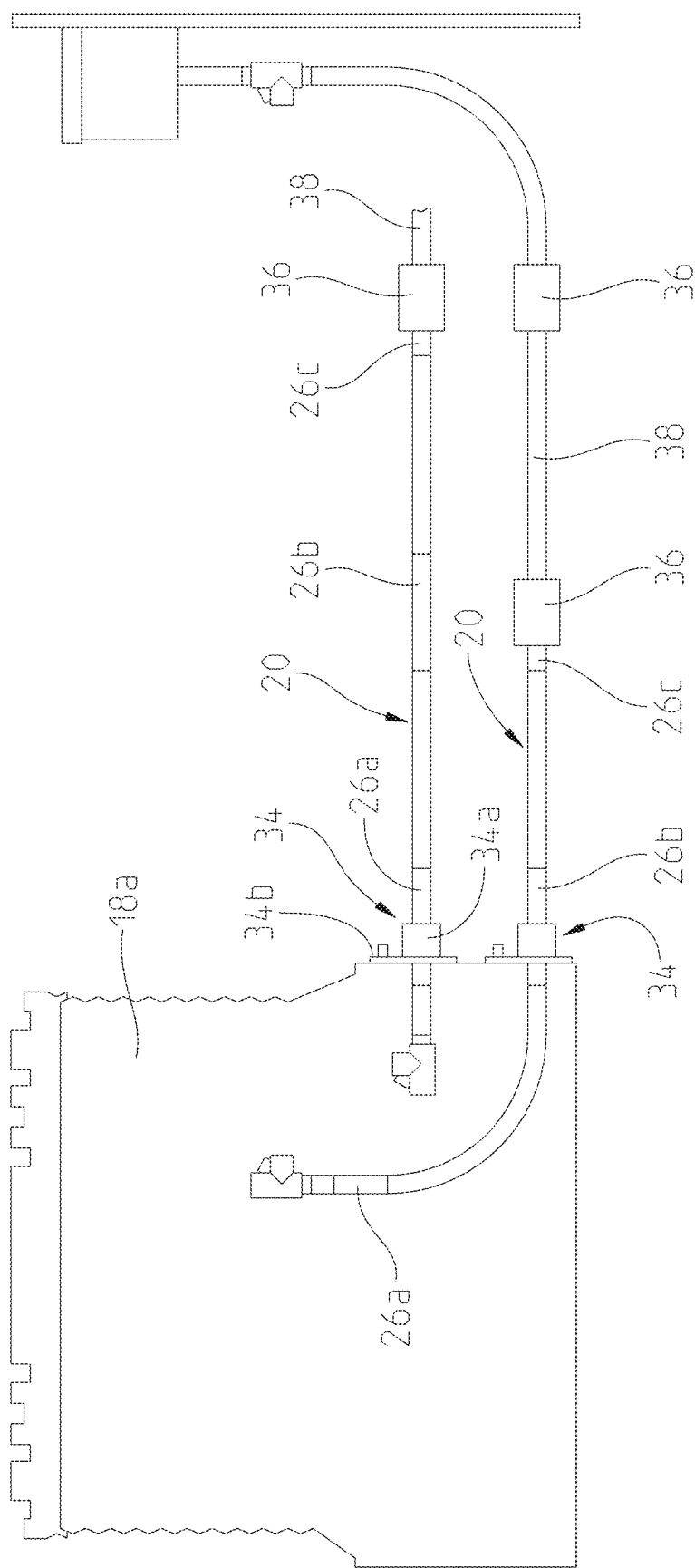
FIG. 2 is a partial cutaway, elevational view of a portion of a fueling system implementing the electrical conduit of the present disclosure.
Figure 4:
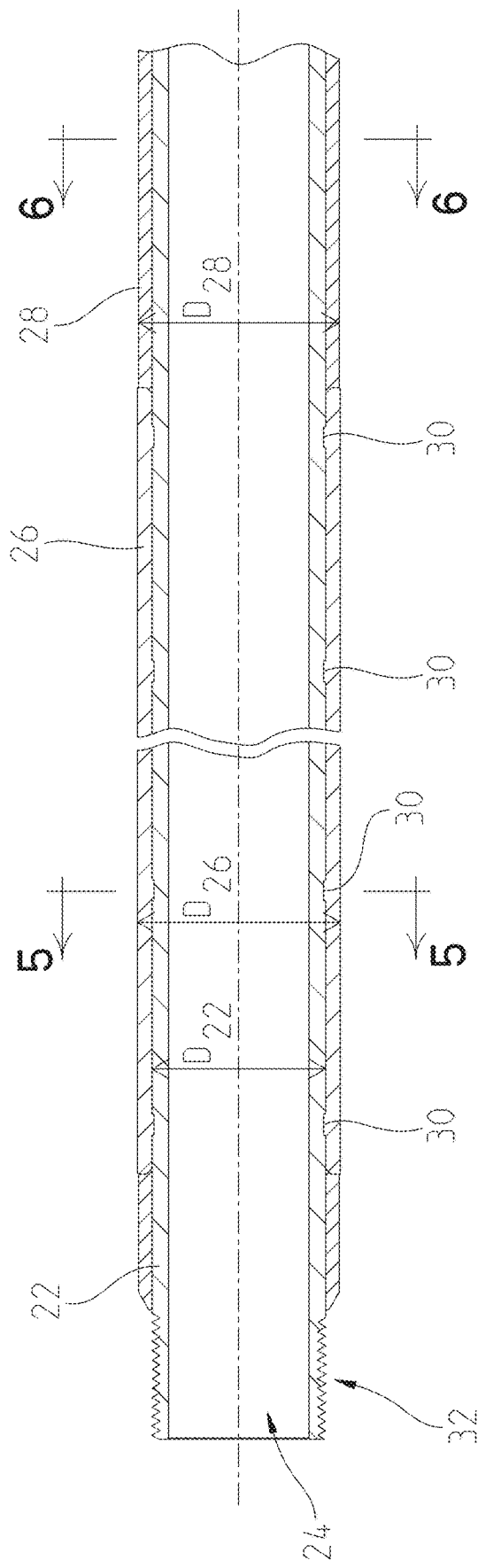
FIG. 4 is a partial, sectional view of the conduit of FIG. 3A taken along line 4-4 of FIG. 3A.

FIG. 2 illustrates an exemplary sump 18a in a partial cutaway view showing conduits 20 positioned through a wall thereof. Before further describing the assembly of FIG. 2, conduit 20 will be described in detail with reference to FIGS. 3A-6. Conduit 20 includes metal pipe 22 forming passageway 24 therethrough. At one end, metal pipe 22 defines threaded section 32 which can be used to threadably secure conduit 20 to further elements within fueling station 10. In the exemplification illustrated, conduit 20 includes 3 electrofusable sections 26 secured about the outer diameter of metal pipe 22. Spanning adjacent electrofusable sections 26 are corrosion resistant sections 28. As shown in FIG. 4, corrosion resistant sections 28 abut electrofusable sections 26 such that corrosion resistant sections 28 and electrofusable sections 26 cooperate to form a corrosion resistant exterior of conduit 20. Corrosion resistant sections 28 comprise sections of a polymer layer, for example a low density polyethylene layer extruded over metal pipe 22. Electrofusable sections 26 comprise areas of high-density polyethylene overmolded onto metal pipe 22. Overmold is used throughout this document to denote a process in which a plastic (in the exemplifications disclosed herein, HDPE) is molded over or onto the underlying metal pipe 22. Alternatively, electrofusable sections 26 may be friction fit or otherwise secured to or formed about metal pipe 22.

Referring to FIG. 3B, metal pipe 22 includes a number of annular grooves 30 formed in the outer surface thereof. In the manufacturing process, metal pipe 22 has corrosion resistant material extruded onto the outer surface thereof. Prior to overmolding electrofusable sections 26 onto metal pipe 22, the corrosion resistant material is locally removed from the area onto which electrofusable sections 26 will be positioned. For example, the corrosion resistant material may be scraped from metal pipe 22 along the area to which electrofusable sections 26 will be applied. Removal of the extruded corrosion resistant layer allows for a greater thickness of electrofusable sections 26 than would otherwise be allowed, while also allowing conduit 22 to be used with standard sized electrofusion couplers.

Figure 6:
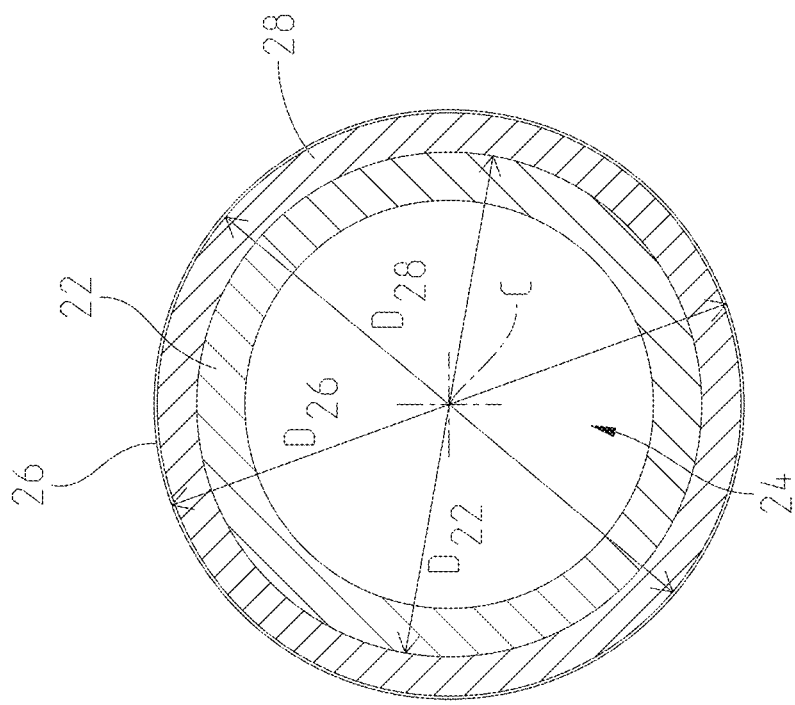
FIG. 6 is a radial, sectional view of the conduit illustrated in FIGS. 3A, 4 and 5 taken along line 6-6 of FIG. 4.
Figure 5:
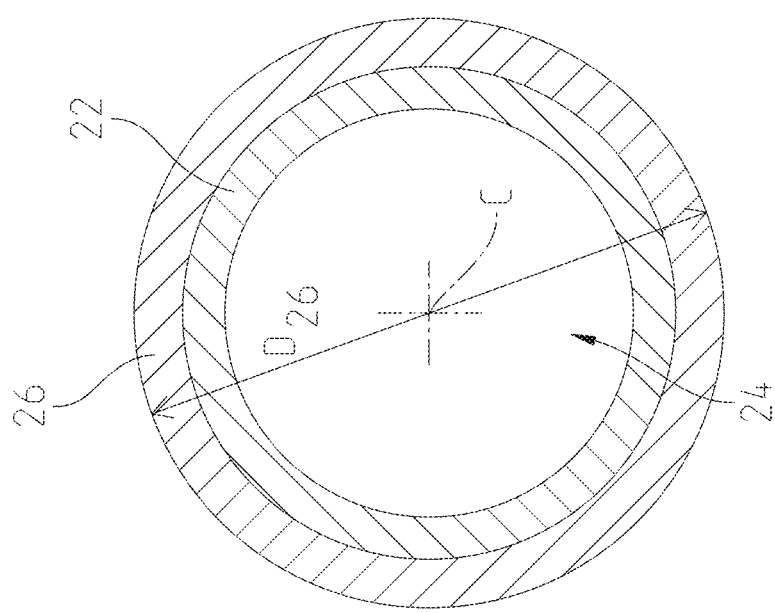
FIG. 5 is a radial, sectional view of the conduit illustrated in FIGS. 3A and 4 taken along line 5-5 of FIG. 4.

After removing the corrosion resistant material, annular grooves 30 are machined in the exterior surface of metal pipe 22. Thereafter, electrofusable sections 26 are individually overmolded onto metal pipe 22, with the material of electrofusable sections 26 flowing into and interdigitating with annular grooves 30 and abutting adjacent areas of the remaining corrosion resistant sections 28. FIG. 4 illustrates the interdigitization, with the high-density polyethylene material of electrofusion sections 26 occupying annular grooves 30. The relative outer diameter of metal pipe 22 in an annular groove 30 and outside of an annular groove 30 is illustrated in FIGS. 5 and 6. When discussed in this document, outer diameter D22 of metal pipe 22 will be taken as the distance through the center C (FIG. 6) of metal pipe 22 to the furthest radial extent of metal pipe 22, i.e., the exterior surface outside of annular grooves 30. Outer diameter D22 of metal pipe 22 (with the exception of the outer diameter at annular grooves 30) is, in one exemplary embodiment of the present disclosure, nominally consistent throughout the length of metal pipe 22 covered by corrosion resistant sections 28 and electrofusable sections 26 (with the exception of the outer diameter at annular grooves 30).

Similarly, outer diameter D28 of each corrosion resistant section 28 and outer diameter D26 of each electrofusable section 26 is nominally consistent along the length of the respective sections 26, 28. In one exemplification of the present disclosure, outer diameter D26 of electrofusable sections 26 is nominally larger than outer diameter D28 of corrosion resistant sections 28. In one exemplification of the present disclosure, outer diameter D22 of metal pipe 22 is nominally 26.67 millimeters (mm) along the length of metal pipe 22 covered by electrofusable sections 26 and corrosion resistant sections 28 (with the exception of the outer diameter at annular grooves 30). In this exemplification, the nominal outer diameter D28 of corrosion resistant sections 28 is a maximum of 32 mm, while the nominal outer diameter D26 of electrofusion sections 26 is 32-32.4 mm. In this embodiment, the overall length of conduit 20 is 1850 mm nominally, with threaded section 32 nominally (all dimensions noted herein are nominal dimensions without regard to whether they are specifically noted as such) extending over an axial length of 20.1 mm and each electrofusable section 26 extending over an axial length of 200 mm. As metal pipe 22 (including at annular grooves 30), electrofusable sections 26, and corrosion resistant sections 28 are all nominally circular, they can be said to have geometrically similar exterior geometries.

In an alternative exemplification of the present disclosure, outer diameter D22 of metal pipe 22 (with the exception of the outer diameter at annular grooves 30) is nominally 33.4 mm along the length of metal pipe 22 covered by electrofusable sections 26 and corrosion resistant sections 28. In this exemplification, the nominal outer diameter D28 of corrosion resistant sections 28 is a maximum of 39 mm, while the nominal outer diameter D26 of electrofusable sections 26 is 39-39.4 mm. In this embodiment, the overall length of the conduit remains 1850 mm nominally, with threaded section 32 nominally extending over an axial length of 24.9 mm and each electrofusable section 26 extending over an axial length of 200 mm. Each electrofusable section 26 may be contiguous with further high-density polyethylene overmoulding on which markings are positioned. This may extend the length of high-density polyethylene at each electrofusable section 26 to 244 mm, with 200 mm available for electrofusion welding i.e. the portion of high-density polyethylene free of markings.

In certain exemplary embodiments, the radial thickness of electrofusable sections 26 is nominally 2.67 mm thick (except over annular grooves 30) while the corrosion resistant sections 28 have a nominal radial thickness of 1.8 mm. Generally, the electrofusable sections 26 can be 1.5 times thicker than the corrosion resistant sections 28. In certain exemplifications, the electrofusable sections 26 have a radial thickness nominally equal to $1/11$ of the outer diameter of the underlying metal pipe 22. In alternative exemplifications, this ratio can be $1/9$ or $1/13.6$.

Referring to FIG. 3A, each conduit 20 includes three electrofusable sections 26a, 26b, and 26c comprising HDPE. Specifically, electrofusable sections 26 are formed of PE 100, which is a designation based on the long-term strength of the material, known as the minimum required strength (MRS) in accordance with ISO 12162. Specifically, PE 100 has an MRS of 10 megapascals (MPa), as determined by performing regression analysis in accordance with ISO 9080 on the test data from the results of long-term pressure testing. PE 80 could also be used as the material of electrofusable sections 26. Alternative exemplary materials used to form electrofusable sections 26 include BORSAFE HE 3490-LS available from BORELAIS/BOROUGE; ELTEX TUB 121, ELTEX TUB 121 N3000, ELTEX TUB 121 N6000 available from INEOS; VESTOLEN A 6060 R available from SABIC; HOSTALEN CRP 100 available from LYONDELLBASELL; and GP 100 NK available from BRASKEM. These materials all allow for leak free electrofusion to, for example, electrofusion entry boots and couplers such as the electrofusion components disclosed in U.S. Patent Application Publication No. 2012/0056418, the entire disclosure of which is hereby explicitly incorporated by reference herein. Additional electrofusion couplers and joints usable with conduit 20 of the present disclosure are described in Piping & Containment Systems Service Station Hardware Fuel Management Systems Submersible Pumping Systems, Brasil Product Catalogue, effective Aug. 1, 2002, filed in an Information Disclosure Statement filed with the filing of the present patent application, the entire disclosure of which is hereby explicitly incorporated by reference herein. All references to ISO or any other specifications in this document will be understood by a person having ordinary skill in the art as a version of the cited specification adopted and in use as of the filing of this patent application.

Generally speaking, electrofusion couplings include a tubular sleeve into which conduit can be positioned, with the inner diameter of the tubular sleeve being sized to closely match the outer diameter of the conduit to which the coupling will be electrofused. The electrofusion coupling and conduit form a tight sliding fit prior to electrofusion such that the coupling can be slid onto the conduit. The electrofusion coupling includes an energy transfer means typically in the form of a wire coil embedded into the electrofusion coupling through which current can be passed to heat the electrofusion coupling and underlying conduit wall to fuse the plastic of the electrofusion coupling with the plastic of the conduit positioned therein. Additional details regarding electrofusion couplers can be found in International Patent Application Publication Number WO 2016/164064 entitled ELECTRICAL TRANSITION CHAMBER and U.S. Patent Application Publication Number 2005/0029802 entitled COUPLING, the entire disclosures of both of which are hereby expressly incorporated by reference herein.

Conduit 20 provides three electrofusable sections 26a, 26b and 26c to allow for flexibility of connections to conduit 20, without requiring the entire length of conduit 20 to be formed of an electrofusable material. Electrofusable sections 26a and 26b each have opposite terminal ends beyond which metal pipe 22 extends, while electrofusable section 26c terminates at one end with metal pipe 22. Referring to FIG. 2, two possible installations of conduit 20 are shown. The upper conduit 20 illustrated in FIG. 2 shows a straight penetration into sump 18a. This configuration is many times utilized to convey high voltage cables into sump 18a. In such a configuration, electrofusable section 26a adjacent to threaded section 32 (FIG. 4) is electrofusion welded to sump 18a via electrofusion coupling 34. Specifically, electrofusion coupling 34 includes electrofusion sleeve 34a and electrofusion flange 34b. Conduit 20 passes through electrofusion sleeve 34a with a tight sliding fit experienced therebetween. In the position shown in FIG. 2, current can be passed through an embedded electrofusion coil in electrofusion sleeve 34a to fuse electrofusion sleeve 34a to electrofusable section 26a of conduit 20. Similarly, current can be passed through an electrofusion coil embedded in the face of electrofusion flange 34b to electrofuse electrofusion coupling 34 to polyethylene sump 18a. In the event that sump 18a is made of fiberglass, then utilization of an electrofusable section over conduit 20 is not necessary, as conduit 20 will be secured to the sump via a compression fitting.

In the straight penetration shown with upper conduit 20 in FIG. 2, the middle electrofusable section 26b is not utilized in an electrofusion process, but end electrofusable section 26c is electrofused via electrofusion coupler 36 to high-density polyethylene conduit 38. In the lower conduit 20 illustrated in FIG. 2, the underlying metal pipe has been bent to form an elbow in conduit 20. This configuration is particularly useful with a low entry penetration into sump 18a with the bend allowing conduit 20 to reach a high position junction box. Such a configuration is particularly useful when conduit 20 carries intrinsically safe low voltage cables. In this configuration, intermediate electrofusable section 26b is electrofusion coupled to sump 18a as described in detail above with respect to the upper conduit 20 illustrated in FIG. 2. End electrofusable section 26c is then electrofusion coupled via electrofusion coupler 36 to high-density polyethylene conduit 38 which can be further electrofusion coupled to a spigoted rigid metal conduit incorporating an elbow as illustrated in FIG. 2. Additional components usable with the configurations illustrated in FIG. 2 can be found in the Cable Tight System Total System Solutions Site Starter document filed in an Information Disclosure Statement filed with the filing of the present patent application, the entire disclosure of which is hereby explicitly incorporated by reference herein.

Additional details of the conduit of the present disclosure and application thereof in a fueling station system can be found in Cable Tight System Water Tight Wire Management, filed in an Information Disclosure Statement filed with the filing of the present patent application, the entire disclosure of which is hereby explicitly incorporated by reference herein. Yet further details are found in CABLE TIGHT SYSTEM, CABLE TIGHT SYSTEM INSTALLATION GUIDE, CABLE TIGHT WIRE MANAGEMENT SYSTEM, all of which are filed in an Information Disclosure Statement filed with the filing of the present patent application and illustration of fueling installation components found in the final Appendix to provisional patent application Ser. No. 62/616,400, the entire disclosures of which are hereby incorporated by reference herein. While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A fueling system, comprising:
a first underground fueling component;
a second underground fueling component; and
an underground conduit extending from the first underground fueling component to the second underground fueling component, the underground conduit comprising:
    a metal pipe having a radially interior wall surface defining an interior passageway, the metal pipe further having a radially exterior wall surface and a longitudinal pipe wall defined between the radially interior wall surface and the radially exterior wall surface;
    a first electrofusable section having a radially interior wall surface facing said radially exterior wall surface of said metal pipe, the radially interior wall surface of the first electrofusable section secured to the radially exterior wall surface of said metal pipe by at least one of:
        overmolding the radially interior wall surface of the first electrofusable section onto the radially exterior wall surface of the metal pipe, and
        friction fitting the radially interior wall surface of the first electrofusable section onto the radially exterior wall surface of the metal pipe;
    said first electrofusable section having a first terminal end and an opposing second terminal end, said first electrofusable section formed of a plastic, said first electrofusable section positioned over an intermediate area of said metal pipe, said radially exterior wall surface of said metal pipe extending at a substantially constant diameter beyond said first terminal end of said first electrofusable section and at the substantially constant diameter beyond said opposing second terminal end of said first electrofusable section;
wherein the underground conduit further comprises a corrosion resistant section comprising a polymer layer extending over said metal pipe, said polymer layer and said first electrofusable section cooperating to provide an exterior corrosion resistant coating to the conduit; and
wherein the plastic forming said first electrofusable section comprises a polymer having a higher density than said corrosion resistant section.

2. A fueling system, comprising:
a first underground fueling component;
a second underground fueling component; and
an underground conduit extending from the first underground fueling component to the second underground fueling component, the underground conduit comprising:
    a metal pipe having a radially interior wall surface defining an interior passageway, the metal pipe further having a radially exterior wall surface and a longitudinal pipe wall defined between the radially interior wall surface and the radially exterior wall surface;
    a first electrofusable section having a radially interior wall surface facing said radially exterior wall surface of said metal pipe, the radially interior wall surface of the first electrofusable section directly secured to the radially exterior wall surface of said metal pipe, said first electrofusable section having a first terminal end and an opposing second terminal end, said first electrofusable section having a length spanning between the first terminal end and the opposing second terminal end, said first electrofusable section having a first electrofusable section exterior geometry defining a consistent first electrofusable section outer diameter over the length of the first electrofusable section; wherein said radially exterior wall surface of said metal pipe extends at a substantially constant diameter beyond both said first terminal end and said opposing second terminal end of said first electrofusable section;
further comprising a corrosion resistant section comprising a polymer layer extending over said metal pipe, said polymer layer and said first electrofusable section cooperating to provide an exterior corrosion resistant coating to the conduit;
wherein said electrofusable section comprises a polymer having a higher density than said corrosion resistant section.

3. A fueling system, comprising:
a first underground fueling component;
a second underground fueling component;
an underground conduit extending from the first underground fueling component to the second underground fueling component, the underground conduit comprising:
    a metal pipe having a radially interior wall surface defining an interior passageway, the metal pipe further having a radially exterior wall surface and a longitudinal pipe wall defined between the radially interior wall surface and the radially exterior wall surface; and
    a first electrofusable section having a radially interior wall surface facing said radially exterior wall surface of said metal pipe, the radially interior wall surface of the first electrofusable section directly secured to the radially exterior wall surface of said metal pipe, said first electrofusable section having a first terminal end and an opposing second terminal end, said first electrofusable section having a length spanning between the first terminal end and the opposing second terminal end, said first electrofusable section having a first electrofusable section exterior geometry defining a consistent first electrofusable section outer diameter over the length of the first electrofusable section;

wherein said radially exterior wall surface of said metal pipe extends at a substantially constant diameter beyond both said first terminal end and said opposing second terminal end of said first electrofusable section;

a sump having a sump wall, the conduit positioned through an aperture formed in the sump wall; and an electrofusion fitting electrofused to the conduit and to the sump wall to form a fluid tight seal between the conduit and the sump wall.

4. A fueling system, comprising:

a first underground fueling component;

a second underground fueling component; and an underground conduit extending from the first underground fueling component to the second underground fueling component, the underground conduit comprising:

a metal pipe having a radially interior wall surface defining an interior passageway, the metal pipe further having a radially exterior wall surface and a longitudinal pipe wall defined between the radially interior wall surface and the radially exterior wall surface;

a first electrofusable section having a radially interior wall surface facing said radially exterior wall surface of said metal pipe, the radially interior wall surface of the first electrofusable section secured to the radially exterior wall surface of said metal pipe by at least one of:

overmolding the radially interior wall surface of the first electrofusable section onto the radially exterior wall surface of the metal pipe, and friction fitting the radially interior wall surface of the first electrofusable section onto the radially exterior wall surface of the metal pipe;

said first electrofusable section having a first terminal end and an opposing second terminal end, said first electrofusable section formed of a plastic, said first electrofusable section positioned over an intermediate area of said metal pipe, said radially exterior wall surface of said metal pipe extending at a substantially constant diameter beyond said first terminal end of said first electrofusable section and at the substantially constant diameter beyond said opposing second terminal end of said first electrofusable section; and a second electrofusable section having a first terminal end that is spaced apart from the second terminal end of the first electrofusable section and a second terminal end that terminates at an end of the metal pipe.

* * * * *